F. M. HORN.
REPLANTING ATTACHMENT FOR CULTIVATORS.
APPLICATION FILED MAY 19, 1909.
937,306.
Patented Oct. 19, 1909.
3 SHEETS—SHEET 1.
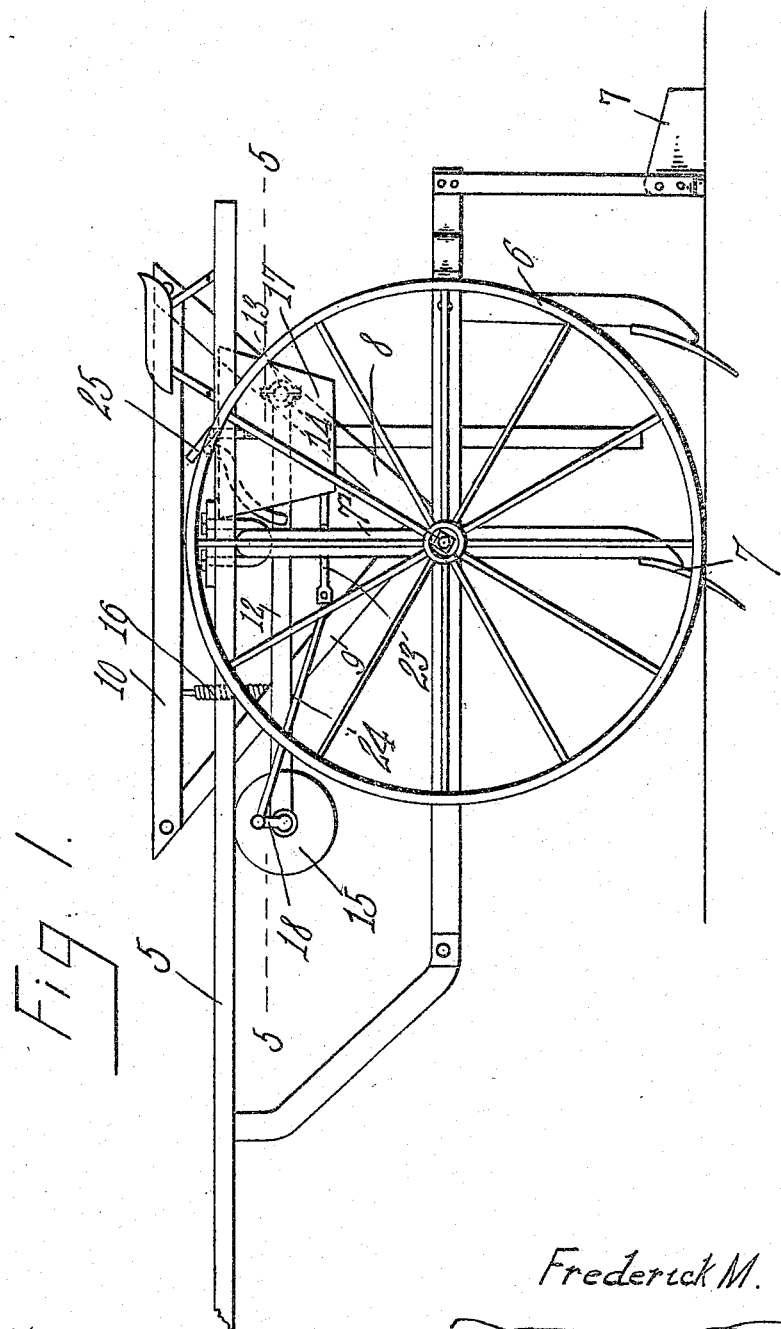
Inventor
Frederick M. Horn.
Witnesses

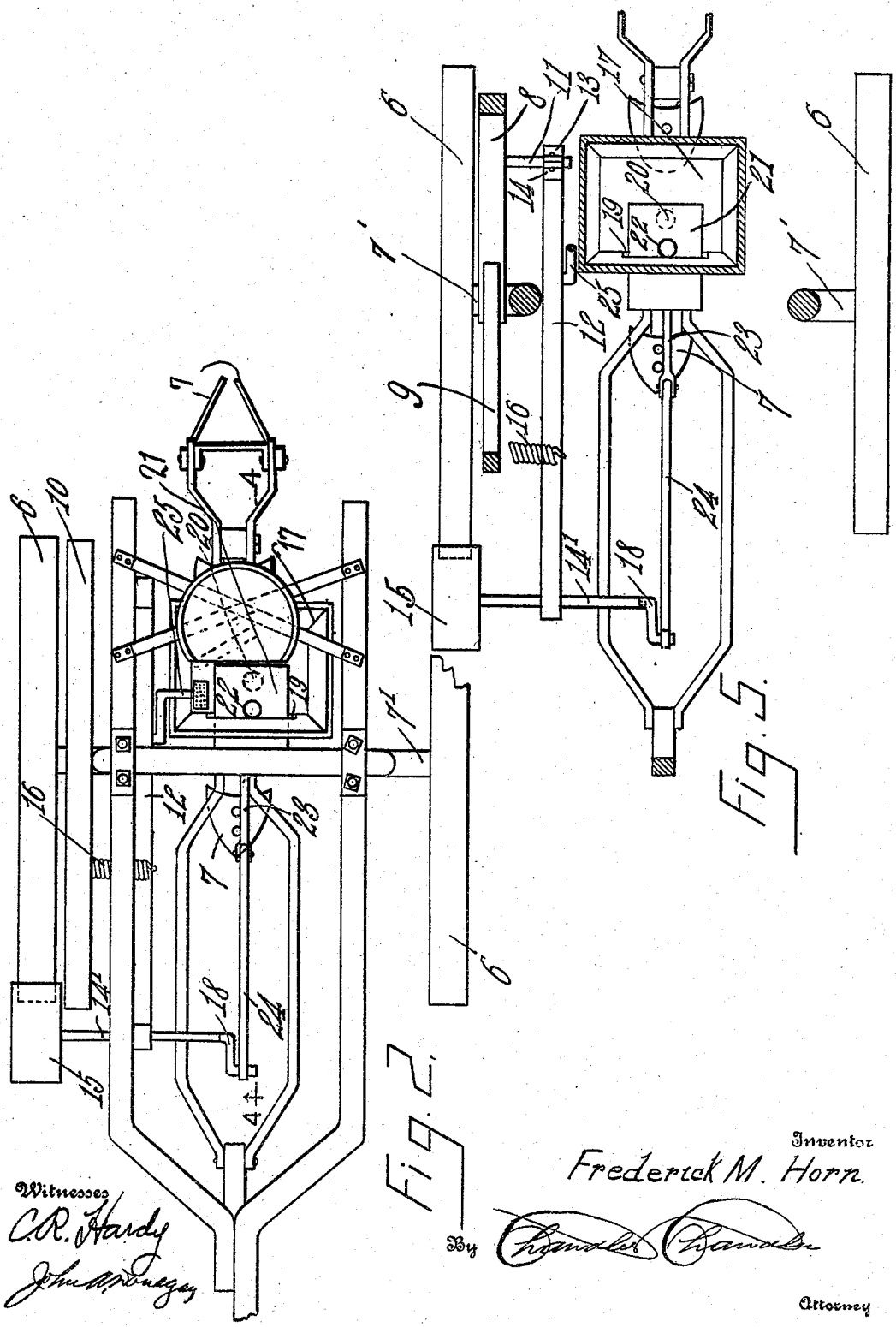

F. M. HORN.
REPLANTING ATTACHMENT FOR CULTIVATORS.
APPLICATION FILED MAY 19, 1909.
937,306.
Patented Oct. 19, 1909.
3 SHEETS—SHEET 3.
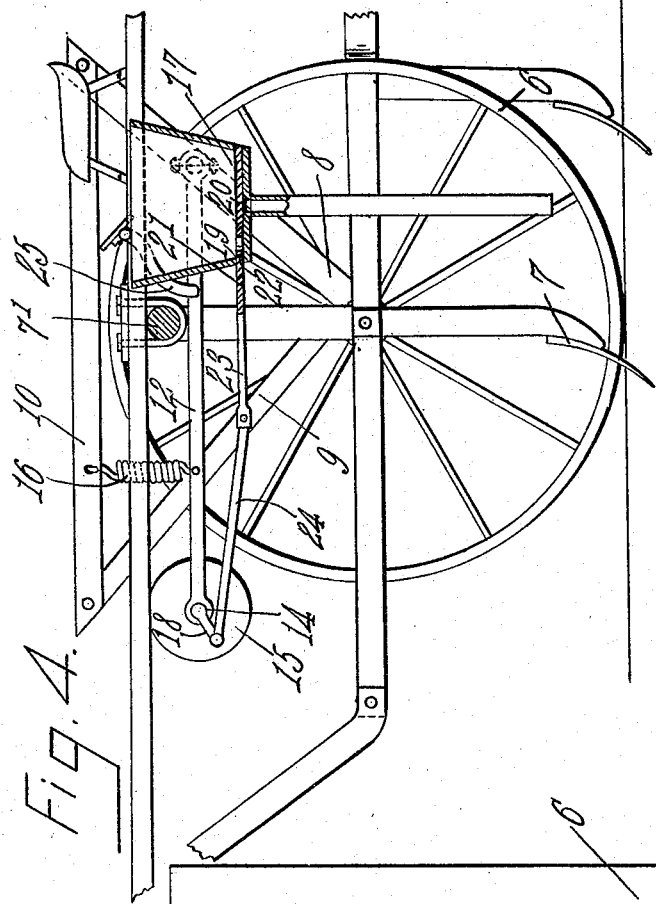
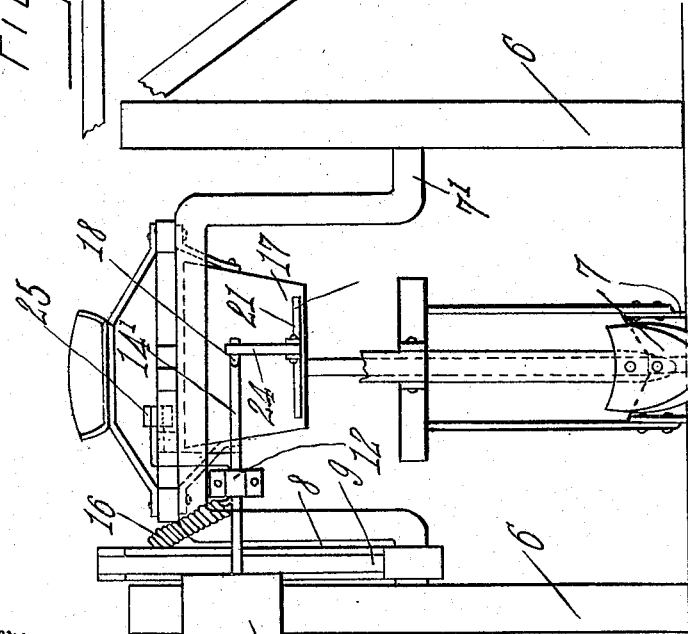
Witnesses
C. R. Hardy.
John A. Donegan.
Inventor
Frederick M. Horn
By
Chandler & Chandler
Attorney

UNITED STATES PATENT OFFICE.

FREDERICK M. HORN, OF GLASCO, KANSAS.

REPLANTING ATTACHMENT FOR CULTIVATORS.

937,306.  Specification of Letters Patent.  Patented Oct. 19, 1909.

Application filed May 19, 1909. Serial No. 497,043.

*To all whom it may concern:*

Be it known that I, FREDERICK M. HORN, a citizen of the United States, residing at Glasco, in the county of Cloud, State of Kansas, have invented certain new and useful Improvements in Replanting Attachments for Cultivators; and I do hereby declare the following to be a full, clear, and exact description of the invention, such as will enable others skilled in the art to which it appertains to make and use the same.

This invention relates to improvements in agricultural implements and more particularly to cultivators.

It has for one of its objects the provision of an attachment for a cultivator by means of which unplanted spaces in a corn field may be replanted during the first trip of the cultivator.

It is well known that during the operation of planting corn with a planter, that the latter fails to deposit in the ground the seed at required intervals. During the operation of planting it is impossible to determine this omission in rows of corn and it is only when the sprouts appear that the unplanted spaces are seen. After the sprouts appear it is necessary to cultivate the same in the usual manner and after this operation has been performed, it has been the usual custom to then replant the vacant spaces.

The present invention aims to remedy this defect by providing an attachment for a cultivator by means of which the corn will be planted during the first trip of the cultivator over the land, whereby considerable time and labor will be spared.

Another object is the provision of an attachment which can be applied to most forms of cultivators now in use.

With these and other objects in view as will more fully hereinafter appear, the present invention consists in certain novel details of construction and arrangement of parts, hereinafter fully described, illustrated in the accompanying drawings and more particularly pointed out in the appended claims, it being understood that the various changes in the form, proportion, size and minor details of the device may be made without departing from the spirit or sacrificing any of the advantages of the invention.

In the accompanying drawings forming part of the specification:—Figure 1 is a side elevation of a cultivator equipped with my device. Fig. 2 is a plan view of the same. Fig. 3 is an end view. Fig. 4 is a longitudinal sectional view on the line 4—4 of Fig. 2. Fig. 5 is a sectional plan view on the line 5—5 of Fig. 1.

Similar numerals of reference are employed to designate corresponding parts throughout.

As shown in the drawings the cultivator is designated in general by the numeral 5, the wheels by the numeral 6 and the shovel at the rear end of the cultivator which returns the soil to the plants, by the numeral 7. While the following arrangement is shown applied to a single-row cultivator it must be understood that I am not to be limited to this specific application since from what will appear later, it can be readily understood how the device may be applied to double-row cultivators.

The wheel axle of the cultivator is designated by the numeral 7′, and supports a frame to which the device is secured. The frame in the present instance is shown to consist of the side pieces 8 and 9 which extend upwardly and oblique to the opposite sides of the axle 7′. The upper ends of the sides 8 and 9 are connected by the horizontally disposed cross piece 10, whereby an inverted triangular structure is formed. The frame is spaced from the wheels 6 and extending from the medial portion of the rear side piece 8 is a laterally disposed bearing pin 11.

What will subsequently be termed a supporting arm is designated by the numeral 12. This member may be formed of any suitable material and is oblong in contour and substantially rectangular in cross section, and is of greater length than the distance between the opposite medial points of the sides 8 and 9 of the frame. The forward end of the arm 12 is provided with a pair of clamping straps 13 and 14, which are designed to embrace the bearing bolts 11, but not sufficiently hard to prevent turning. A transverse opening is formed in the opposite end of the arm 12 and constitutes a boxing, in which is journaled a shaft 14′. This member is disposed in a horizontal plane and at its outer end is provided with a friction roller 15, which is disposed adjacent one of the wheels 6, and in position to bear on the same. The arm 12 is supported in place or in a horizontal plane by means of a spring 16, one terminal of which is secured to the cross piece 10 of the frame and the opposite terminal to the forward end portion of the arm 12, this spring so supports the arm 12 that the roller 15 will be held from engagement with the periphery of the wheel 6.

A hopper is suitably supported between the wheels 6, this member is designated by the numeral 17 and is adapted to contain the seeds to be planted. The lower end of the hopper is disposed below the horizontal plane with the arm 12.

That end of the shaft 14' projecting beyond one end of the roller 15 has keyed thereto a crank arm 18 which is operatively connected to the seed slide so that the seeds will be permitted to escape from the latter at the desired moment. The lower end portion of the hopper is provided on one side with an oblong slot or opening 19, and the bottom of the hopper directly beneath this slot is provided with an annular opening 20.

A slide, designated by the numeral 21, is designed to nicely fit within the slot 19, this slide is oblong in contour and adjacent its outer end is provided with an annular opening 22, which is designed to be brought into registration with the opening 20 of the bottom of the hopper. The outer end of the slide terminates in an elongated shank 23 and connection between the shank 23 and crank arm 18 is established by means of a connecting rod 24, one end of which is journaled on the crank arm 18 and the opposite end is pivoted to the outer end of the shank 23 of the slide.

A foot lever in the present instance is designated in general by the numeral 25 and has one end fixedly secured to the medial portion of the arm 12, while its opposite end curves upwardly and rearwardly to a point within easy reach of the foot of the operator.

In the use of the device when the field of corn is being cultivated and the implement arrives at an unplanted spot, the operator depresses the foot lever 25, which will bear down on the arm 12 against the action of the spring 16, this downward movement of the arm 12 brings the roller 15 into engagement with the periphery of the wheel 6, causing the roller and its shaft to rotate, which also rotates the crank arm 18. The latter by virtue of its connection with the slide 20 causes the latter to move inwardly and outwardly through the slot 19, thus bringing the opening 22 of the slide into and out of registration with the opening 20 in the bottom of hopper. Each time the opening 22 of the slide comes into registration with the opening 20 of the hopper a kernel of corn will pass through the alining openings and into the ground, where it will be covered by the shovels.

Thus it will be seen that I have provided a device which will materially reduce the operation of re-planting a corn field, since it can be readily seen that with this device the operation of cultivating and replanting may be done simultaneously. It is to be further observed that the device may be employed with most forms of cultivators now in use, and that it embodies few parts and these so arranged that the danger of derangement will be reduced to a minimum.

Having thus described my invention what is claimed as new, is:—

1. The combination with a wheeled cultivator; of a pivoted arm supported thereby, a roller combined with the arm and yieldingly held from engagement with the wheels, a seed hopper combined with the cultivator and a slide combined with the roller, the structure being such that when the roller engages the wheel of the cultivator the slide will operate to discharge the seed.

2. The combination with a wheeled cultivator; of a pivoted arm supported thereby, a roller combined with the arm and yieldingly held from engagement with the wheels, a seed hopper provided in its bottom with an opening and a slide within the hopper having an opening adapted to be brought into and out of registration with the opening of the hopper and a connection between the slide and roller, whereby when the latter engages the wheels of the cultivator the slide will be reciprocated to bring its opening into and out of registration with the opening of the hopper.

3. The combination with a wheeled cultivator; of a supporting frame combined with the axle of the wheel, a supporting arm pivotally combined with the frame, and a roller at one end of the supporting arm yieldingly held from engagement with the wheels, an operating rod for bringing the roller into and out of engagement with the wheel, a seed hopper provided with an opening in the bottom thereof, a slide combined with the hopper and provided with an opening and a pivoted connection between the slide and roller whereby when the latter rotates the opening of the slide will be brought into and out of registration with the opening of the hopper.

4. The combination with a wheeled cultivator; of a frame combined with the axle of the cultivator, a supporting arm having one end pivoted to one side of the frame, a shaft journaled in the opposite end of the supporting arm, and a roller keyed to the shaft and yieldingly held from engagement with the wheel, a seed hopper provided with an opening in the bottom thereof, a slide combined with the hopper and provided with an opening, a crank arm at one end of the said shaft and a rod connecting the crank arm with the slide, the structure being such that when the roller is brought into frictional engagement with the wheel the slide will be reciprocated to bring its opening into and out of registration with the opening in the bottom of the hopper.

5. The combination with a wheeled cultivator; of a supporting frame combined with the axle of the wheel, a supporting arm having one end pivoted to one side of the frame, a roller journaled in the opposite end of the supporting arm, and a spring for holding the roller from engagement with the wheel of the cultivator, a seed hopper combined with the cultivator and disposed in rear of the roller, said seed hopper being provided in its bottom with an opening, a slide combined with the hopper and provided with an opening, and a connecting rod between the slide and roller operating to bring the opening of the slide into and out of engagement with the opening of the hopper when the roller is brought into engagement with the wheels.

In testimony whereof, I affix my signature, in presence of two witnesses.

FREDERICK M. HORN.

Witnesses:
G. H. BERNARD,
C. A. JAMISON.